Nov. 10, 1931.  A. R. THOMPSON  1,831,330
EXHAUST BOX
Filed April 18, 1928   3 Sheets-Sheet 2

Inventor
Albert R. Thompson
By Lyon & Lyon
Attorneys

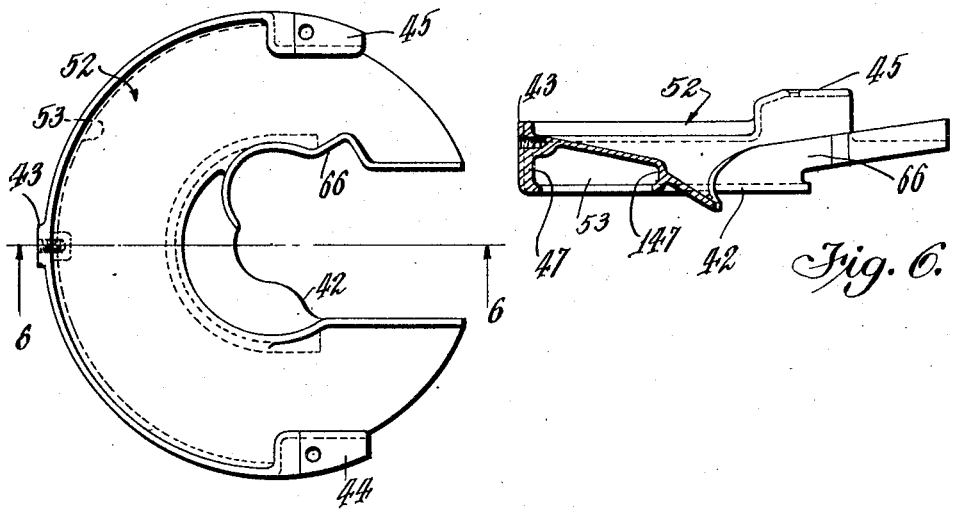
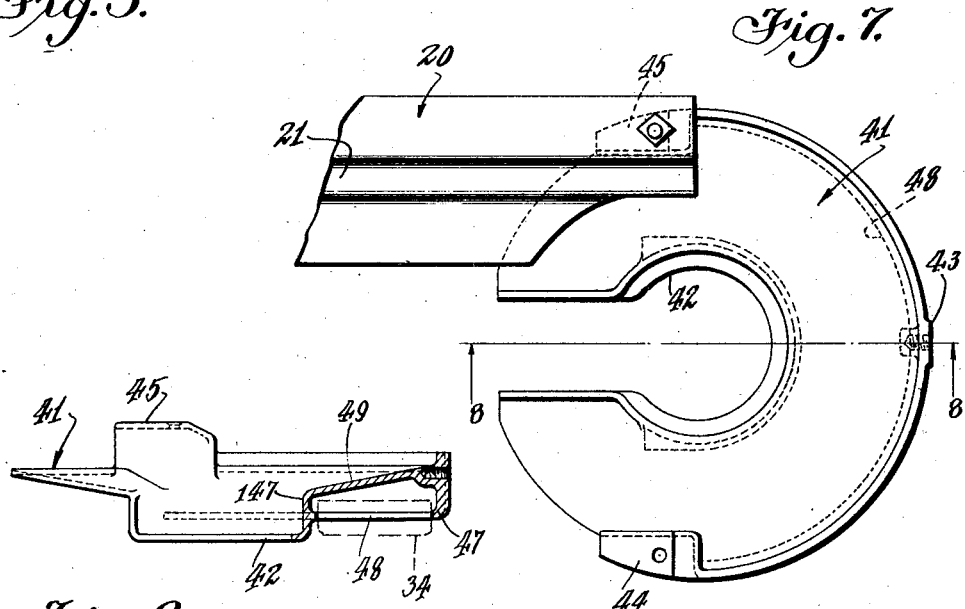

Patented Nov. 10, 1931

1,831,330

UNITED STATES PATENT OFFICE

ALBERT R. THOMPSON, OF SAN JOSE, CALIFORNIA, ASSIGNOR TO ANDERSON-BARNGROVER MFG. CO., OF SAN JOSE, CALIFORNIA, A CORPORATION OF CALIFORNIA

EXHAUST BOX

Application filed April 18, 1928. Serial No. 271,065.

This invention relates to exhaust boxes such, for example, as are commonly employed in the canning art for the heating of food or similar products in cans prior to the hermetical sealing of the cans. This application is for an improved form of spiral exhaust box of the application filed by myself, Serial No. 189,722, filed on May 7, 1927.

The principal object of this invention is to provide an exhaust box through which filled, open-ended cans are caused to travel in a circuitous path, the path of the can being provided with drip pans adapted to receive the drip from said cans and convey the drip away without permitting the same to find its way into other cans.

Another object of this invention is to provide an exhaust box through which filled, open-ended cans are caused to travel in a circuitous path, the path of the can being provided with inclined drip pans adapted to receive the drip from the cans and convey the same away from the cans and the drip pans likewise providing a track through which the cans are caused to travel on a conveyor which is of the endless type and is preferably entirely enclosed within the exhaust box.

Another object of this invention is to provide an improved form of drip pan for an exhaust box and an improved form of return or curved drip pan adapted to connect together the ends of the drip pans in a manner to provide a continuous and uninterrupted path for filled, open-ended cans.

Other objects and advantages of this invention it is believed will be apparent from the following detailed description of a preferred embodiment thereof as illustrated in the accompanying drawings:

In the drawings:

Figure 1 is a top plan view of an exhaust box embodying this invention illustrating the covers of the exhaust box as removed to show the drip pans and return conveyor chain sprockets.

Figure 2 is a side elevation partly in section of an exhaust box embodying this invention and illustrating the front side plate as removed and illustrating only part of the guide pipe in position and illustrating the positions of the remainder of the guide pipes in dotted lines.

Figure 5 is a plan view of the return curved drip pan as employed on the take-up end of the exhaust box embodying this invention.

Figure 6 is a sectional view thereof taken substantially on the line 6—6 of Figure 5.

Figure 7 is a plan view of the return curved drip pan as employed in the stationary end of the exhaust box embodying this invention.

Figure 8 is a sectional view taken substantially on the line 8—8 of Figure 7.

Figure 3:
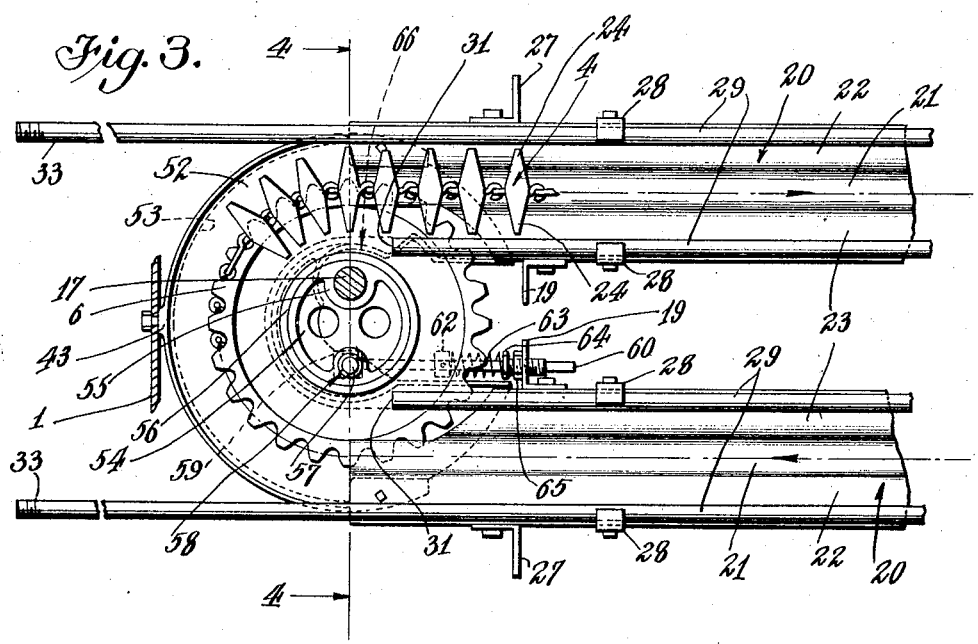
Figure 3 is an enlarged fragmental plan view of the exhaust box embodying this invention illustrating in detail the manner of connection between the drip pans and return curved drip pans embodying this invention and the take-up means provided for the sprockets.
Figure 4:
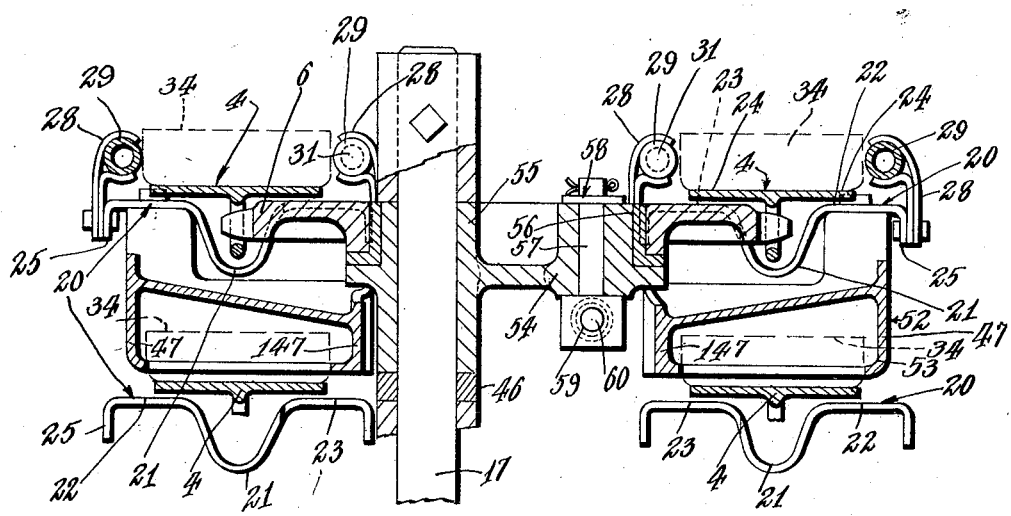
Figure 4 is a sectional view taken substantially on the line 4—4 of Figure 3.

In the preferred embodiment of this invention as illustrated in the accompanying drawings, 1 indicates an enclosed chamber into which cans are adapted to be passed through an inlet 2 and from which cans pass from an outlet 3. In order to subject the contents of the cans to what is known as "the first cook", or to otherwise process the goods of the cans while the cans remain unsealed, and to permit the cans to continuously pass through the chamber 1 during a relatively long period of time, the spiral conveyor is mounted within the chamber 1. The spiral conveyor includes a chain formed of links 4 which are connected together and trained over sprockets 5 and 6.

The sprockets 5 are secured in spaced relation to a shaft 7 which is driven from a shaft 8 by means of a spur pinion 9 which meshes with the ring gear 10 secured to the shaft 7. The shaft 8 is journaled in bearings 11 at its opposite ends and is driven through gears 12 from the shaft 13. The shaft 13 may be driven by any suitable form of prime mover through a pulley 14 or like drive arrangement. The shaft 7 is rotatably supported in the chamber 1 by means of shaft hangers 15 which are secured to vertically extending angle irons 16.

The sprockets 6 are journaled on the eccentric take-up wheels 54 mounted on a shaft 17 which is supported in shaft hangers 18 secured to the angle irons 19.

In order to provide the guides for the cans as they are passed through the spiral track defined by the chain trained over the sprockets 5 and 6, and to provide a drain trough into which the drippings from the cans are drained from the chamber 1 in a manner to prevent the dripping of the cans from falling into other cans, I prefer to mount within chamber 1, in a manner to follow the run of the chain formed by the links 4, drip pans 20 which are formed to provide a substantially V-shaped trough 21 in which the links 4 are mounted. The pans 20 provide substantially flat longitudinally and inclined runways 22 and 23 upon the opposite sides of the trough 21 for supporting the transversely extending branches 24 of the links 4 and forming a track for the chain and the cans being driven through the chamber 1 on the chain.

The pans 20 have downwardly depending edges 25 by means of which the pans are secured in position within the chamber 1 to the vertically extending angle irons 26 and 27.

Secured to the opposite depending edges 25 of the pans 20 are brackets 28 which hold and support pipes 29 upon the opposite sides of the track determined by the pans 20. The pipes 29 mounted upon the inner sides of the pans 20 are connected with steam pipes 30, and the pipes 29 are formed throughout their length with small holes or orifices through which the steam passes to maintain the chamber 1 at an elevated temperature. These inner pipes 29 are closed at their opposite ends 31 by means of plugs or the like. The outer steam pipes 29 are closed by means of plugs or the like at their ends 32 and at their opposite ends extend from the chamber 1 as illustrated at 33 to permit these pipes to be connected with a suitable source of steam under pressure. These outer pipes 29 are also perforated along their length. The pipes 29 are spaced apart a distance slightly greater than the width of the can 34 which is being passed through the chamber 1.

The chain formed of the links 4 is entirely mounted within the chamber 1 and is returned from the last sprocket 6 to the first sprocket 5 by passing over idler pulleys 35 and 36 which are mounted approximately centrally of the chamber 1 intermediate the tracks formed by the pans 20.

The sprockets 35 and 36 are journaled on pins 37 and 38 which are adjustably mounted in brackets 39 and 40 to permit their relative positions to be changed so as to provide take- up means for the chain formed of the links 4.

In order to prevent the cans 34 from dripping one into the other as they are passing around the sprockets 5 and 6, and in order to provide an enclosed path for the cans as they are passing around these sprockets so as to prevent oil or other foreign matter from dripping from the sprockets 5 and 6 and their supporting mechanism into the contents of the cans mounted upon the chain, I provide curved drip pans which are preferably of the following construction:

The drip pans 41 are mounted around the shaft 7, the shaft 7 extending through the central aperture 42. The drip pans 41 are held in position by means of cap screws threaded into the bosses 43 from the end plate of the chamber 1. The pans 41 are connected and supported at ends of the pans 20 by bolts passed through the bosses 44 and 45 formed at the inner ends of the pans 41. The pans 41 being supported in this manner any said pan 41 may be removed as desired without dismantling the assembly. As illustrated in Figure 2, the pans 41 and sprockets 5 are maintained in spaced relation on the shaft 7 by means of bushings 46 mounted on the shaft 7. Pans 41 provide a depending curved flange 47 which extends from the end of one pan 20 to the end of the next pan 20 secured to the pan 41 and the chain formed of the links 4 rides in the opening 48 formed in the pan 41, thereby supporting the can 34 in an enclosed chamber determined by the inclined face 49 of the pan 41 and the depending flange 47.

The outer depending curved flange 47 and the inner flange 147 serve as guides for the can 34. The flanges 47 and 147 provide continuations of the pipe guides 29 the pipe guides 29 abutting the ends of the guides 47 and 147 as shown in Figure 3. This insures that the can 34 will at all times be guided through a definite path and will not abutt a stop to hold the cans from continuous even travel through the exhaust box.

The face 49 of each pan 41 is inclined so that the drippings from above this pan will be conveyed downwardly toward the shaft 7 and will drip through the opening 42 of the pan 41 and will pass to the lower-most point of the chamber 1 and be drawn out through a drain opening 50. The bottom plate 51 of the chamber 1 is inclined downwardly toward the drain opening 50 to drain all drippings and condensate from the chamber 1 through the opening 50.

The pans 52 which surround the shaft 17 are of substantially the same form of construction as the pans 41 in providing an enclosed chamber 53 for the cans as they pass around the shaft 17 but differ from the pans 41 in the provision of means for carrying or accommodating a take-up mechanism for taking up the chain formed of the links 4 as they pass around the sprockets 6. This take-up mechanism is preferably of the following construction and includes an eccentric mounted wheel 54 which is journaled at the hub 55 of the shaft 17. The sprockets 6 are journaled on the rims 56 of the wheels 54 so that they rotate around the rims 56. A pin 57 is secured to each wheel 54, as illustrated at 58. Secured to the end of the pin 57, as illustrated at 59, is a take-up rod 60. The take-up rod 60 extends longitudinally of the chamber 1 and passes through an angle iron 19. A stop 62 is secured to the take-up rod 60 and a spring 63 is mounted on the rod 60 between the stop 62 and the take-up screw 64. The take-up screw 64 is screw threaded through a nut 65 secured to the angle iron 19.

As the take-up screw 64 is rotated to adjust the take-up of the sprocket 6, the sprocket 6 is rotated around the shaft 17 and is yieldably urged in position to take up on the chain formed by the links 4 by means of the spring 63. The curved drip pan 52 is cut out as illustrated at 66 to accommodate the take-up mechanism above described and in other respects this drip pan is similar to the drip pan 41.

Having fully described my invention, it is to be understood that I do not wish to be limited to the details herein set forth, but my invention is of the full scope of the appended claims.

I claim:

1. In an exhaust box, the combination of an enclosure, a spiral track formed in successive flights in said enclosure, open drip pans forming said track and providing a drain trough, and a chain mounted in said drain trough and provided with spaced flights which pass longitudinally along said path, and means connected with said drip pans for draining the same.

2. In an exhaust box, the combination of an enclosure, a spiral track formed in successive flights in said enclosure, drip pans and return curved drip pans forming said track, the drip pans providing a trough and the return curved drip pans providing means for draining said troughs.

3. In an exhaust box, the combination of an endless conveyor, sprockets rotatably supported in said exhaust box and over which said conveyor is trained spirally in successive flights, spaced apart longitudinally extending drip pans for each flight of said conveyor, return curved drip pans connecting the ends of said longitudinally extending drip pans and a series of adjustably mounted sprockets interposed between said drip pans within the exhaust box and provided with idler pulleys over which the endless conveyor is trained to pass from the ends of the spiral tracks.

4. In an exhaust box, the combination of an enclosure, a spiral track formed in said enclosure in vertically spaced flights, open drip pans forming said track and providing a drain trough, and a chain mounted in said trough and provided with spaced flights and means connected with said drip pans for draining the same.

5. In a device of the class described, the combination of a spiral track, drip pans defining said track and providing drain troughs, and curved return drip pans connecting the ends of the first said drip pans and providing enclosures through which the cans on said track pass in passing from one of the first said pans to the next.

6. In an exhaust box, the combination of a spiral track, the track being formed in vertically spaced flights, the track having curved drip pans forming return curves for said track and said curved drip pans providing means for protecting the cans in the vertically spaced flights from dripping from one can to the other and means connected with said drip pans for draining the same.

7. In an exhaust box, the combination of an enclosure, a track formed in the enclosure and providing spaced longitudinally extending portions, and curved drip pans connecting the longitudinally extending portions and providing enclosures for the cans traveling said track.

8. In an exhaust box, the combination of an enclosure, a spiral track formed in successive vertically disposed flights in said enclosure, and drip pans below the spiral track providing a means for carrying the drippings from the cans in the respective flights of said tracks to prevent the cans in one flight from dripping into the cans of another flight, and means connected with the drip pans for draining the same.

9. In an exhaust box, the combination of an enclosure, a spiral track formed in successive flights in said enclosure, drip means defining the spiral track and adapted to receive the drippings from the cans in the respective flights, means mounted in the drip means for conveying the cans through the respective flights, and means for delivering the drippings from the drip means within the spiral formed by said drip means so that the drippings from the cans in one flight are prevented from falling into the cans of another flight.

10. In an exhaust box, the combination of an enclosure, a spiral track formed in successive flights in said enclosure, drip means and return curved drip pans forming said flights, the drip pans providing a trough and a return curved drip means providing means located near the axis of said return curved drip means for draining said troughs.

11. In an exhaust box, the combination of an endless conveyor, sprockets rotatably supported in said exhaust box over which said conveyor is trained spirally in successive flights, spaced apart longitudinally extended drip pans for each flight of said conveyor, return curved drip means connecting the ends of said longitudinally extended drip pans, and a series of adjustably mounted sprockets interposed between said drip pans within the exhaust box and provided with idler pulleys over which the endless conveyor is trained to pass from the ends of the spiral tracks, and means positioned substantially axially of said sprockets through which the drippings from said pans pass.

12. In an exhaust box, the combination of an enclosure, a track formed in the enclosure and providing spaced longitudinally extending portions, and curved drip means connecting the longitudinally extending portions, the curved drip means being provided with means for draining the drippings from said pans into the enclosure.

13. In an exhaust box, the combination of an enclosure, a spiral track formed in the enclosure and providing spaced longitudinally extending portions inclined from the horizontal, curved drip means connecting the longitudinally extending portions and providing enclosures for the cans traveling said track when passing through the curved drip pans, and means for collecting the drippings passing through the inclined longitudinally extending portions of the track and for delivering the same from the track to the bottom of the enclosure.

14. In an exhaust box, the combination of a spiral track, drip means defining said spiral track and providing drain troughs, and including curved return drip pans, the said return curved drip pans providing means for preventing the drippings from one of said pans falling into the next lower pan, and means for draining the drippings from the drain trough.

Signed at San Jose, Calif., this 5th day of April, 1928.

ALBERT R. THOMPSON.